Figure 1:
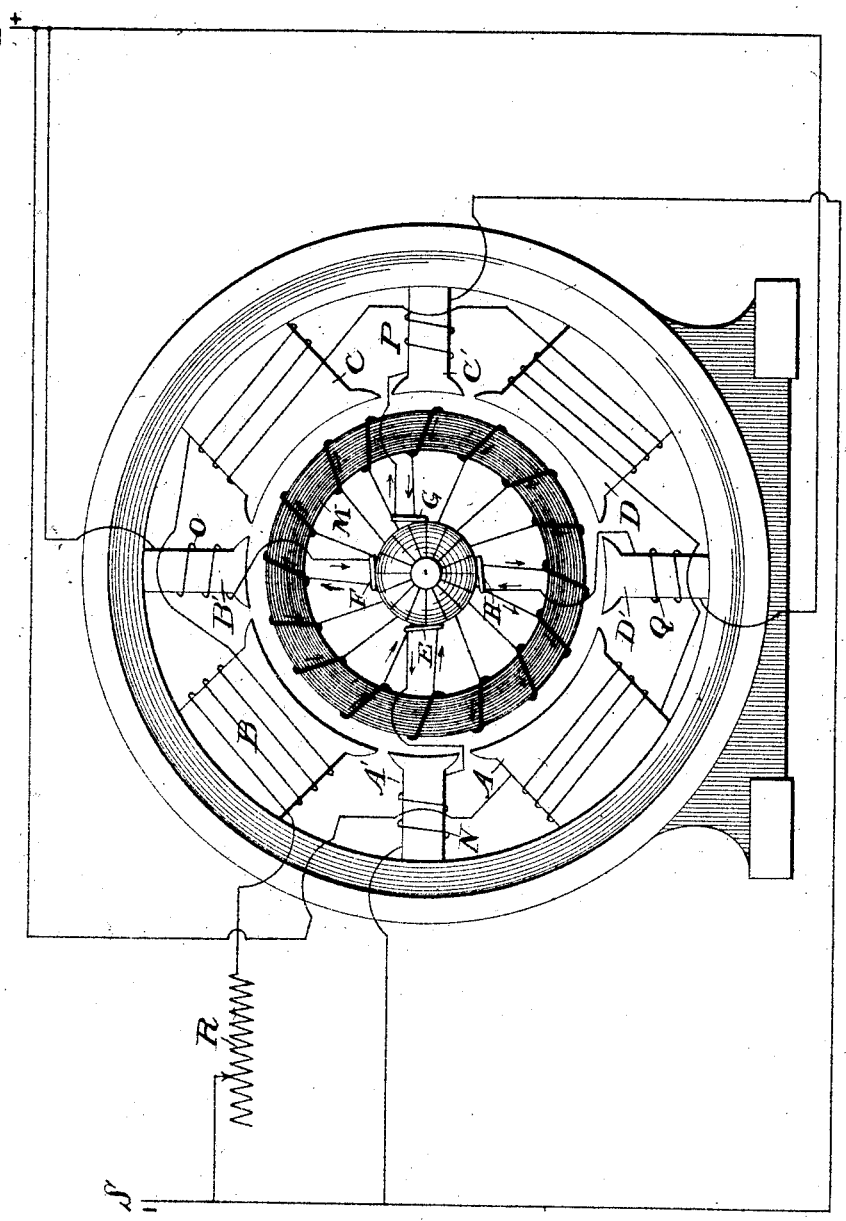

C. H. BEDELL.
DYNAMO ELECTRIC MACHINE.
APPLICATION FILED OCT. 27, 1906.

1,010,216.

Patented Nov. 28, 1911.
2 SHEETS—SHEET 1.

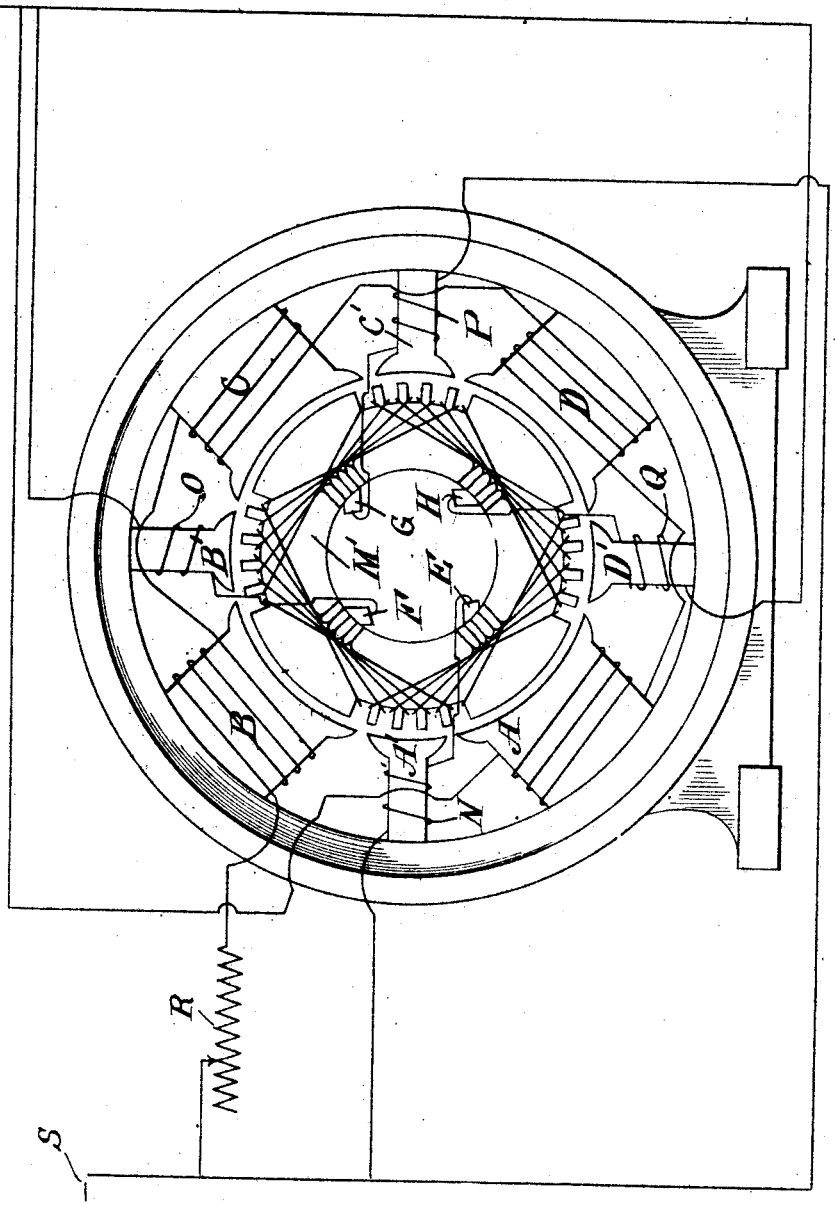

UNITED STATES PATENT OFFICE.

CHARLES H. BEDELL, OF BAYONNE, NEW JERSEY, ASSIGNOR TO ELECTRO-DYNAMIC COMPANY, OF BAYONNE, NEW JERSEY, A CORPORATION OF NEW JERSEY.

DYNAMO-ELECTRIC MACHINE.

1,010,216.  Specification of Letters Patent.  Patented Nov. 28, 1911.

Application filed October 27, 1906. Serial No. 340,853.

*To all whom it may concern:*

Be it known that I, CHARLES H. BEDELL, a citizen of the United States, residing at Bayonne, county of Hudson, in the State of New Jersey, have invented certain new and useful Improvements in Dynamo-Electric Machines; and I do hereby declare the following to be a full, clear, and exact description of the invention, such as will enable others skilled in the art to which it appertains to make and use the same.

My invention relates particularly to that class of multi-polar dynamo electric machines, in which sparkless commutation is attained by creating a commutating field adapted to generate in the armature coils undergoing commutation, an electro-motive force in the proper direction and of proper amount to secure sparkless commutation. It has heretofore been proposed to secure this result in multi-polar dynamo electric machines in various ways, as for example, by providing auxiliary poles between the main poles for the purpose of creating the desired commutating field, or by winding the appropriate tip of the main pole with an auxiliary commutating coil, and in other similar ways known to the art. In such machines, however, it has been customary to create the desired commutating field by means of electro magnets wound with existing coils connected in series with the armature and carrying the whole armature current. In such case, the field of the commutating poles may bear an approximately constant relation to the opposing pole in the armature, if each armature circuit is carrying at all times substantially the same current as every other armature circuit, which would be the case if the armature were wound with a wave winding, so that each armature circuit has substantially the same fraction of its length under each pole of the machine. In machines having parallel or lap winding, however, this condition does not exist, and one armature circuit may have all, or substantially all, of its length under one pole, or under two adjacent poles in the machine, every other armature circuit having all, or substantially all, of its length under another one, or two other adjacent poles in the machine. In such case, if the strength of the magnet field under one pole is different from the strength of the magnet field under another pole for any reason, or if the armature is not accurately centered in its bearings, or if for any other reason the air gap under one pole of the machine is different from the air gap under another pole of the machine, then there result in the different armature circuits currents of different strength. If now in such machines the auxiliary commutating field is, as has heretofore been customary, created by an electro-magnet energized by coils in series with the armature as a whole, the strength of the commutating fields do not partake of the differences in the strengths of the armature currents in the different armature circuits, but, on the contrary, remain at all times equal, irrespective of the differences in the strengths of the currents in the different armature circuits. The result of this is that the different commutating fields are not always of the proper strength to secure sparkless commutation, and sparking results.

The object of my invention is to overcome this difficulty in machines in which such unbalanced condition of the currents in the different armature circuits is liable to exist, and I accomplish this result by making an unbalancing of the current strength in the different armature circuits effective on the strength of the commutating fields.

In order to make clear to those skilled in the art the nature and mode of operation of my invention, I have illustrated in the accompanying drawings two embodiments of it.

Figure 1 represents diagrammatically a variable speed direct-current dynamo-electric machine having four main poles and four interpoles and having an armature with a parallel ring winding. Fig. 2 represents a variable speed, direct-current dynamo-electric machine having four main poles and four interpoles and having an armature with a parallel drum winding.

It will be understood, however, that my invention is applicable to any type of dynamo-electric machine either generator or motor and having a ring, drum or a disk armature, so long as for any reason the currents carried in the different armature circuits are liable to variation in strength with respect to one another.

Referring to Fig. 1 of the drawings, A, B, C and D represent the four main poles of a shunt wound variable speed dynamo electric machine having a variable resistance R in the shunt circuit. The machine has four commutating poles A', B', C' and D', and a ring armature M with four brushes or current collectors E, F, G and H. It will be seen that the armature winding here shown is of the parallel type and we may assume that the direction of rotation is such that the current flows in the armature circuits in the direction indicated by the small arrows. In order to maintain the commutating fields at all times of the proper strength to secure sparkless commutation under the circumstances above specified, I wind each interpole with a winding, one end of which is connected to that brush which is commutating the armature coil or coils directly beneath the particular interpole and the other end of which is connected to the external circuit. That is, the winding N on the interpole A' is connected to the brush E; the winding O on the interpole B' is connected to the brush F, the winding P on the interpole C' is connected to the brush G, the winding Q on the interpole D' is connected to the brush H. The other ends of the windings O and Q, which are connected to the positive brushes F and H are connected together to the positive lead T, and the other ends of the windings N and P which are in circuit with the negative brushes E and G are connected to the negative lead S. Though I have shown the winding N on the pole A' connected to the brush E, which is directly opposite that pole, it will be understood that if the armature connectors are twisted, as is sometimes the case, this brush may not be directly beneath the pole.

In Fig. 2 of the drawings is represented a machine in all respects similar to that shown in Fig. 1, excepting that the machine shown in Fig. 2 has a parallel wound drum armature. The reference letters in the two figures correspond excepting that the armature in Fig. 2 is lettered M'.

It will be observed that by this construction I secure a commutating field which is not only substantially proportional to the whole armature current, as has heretofore been the case, but I secure a commutating field at each point of commutation which is effected by an unbalancing of the current strength in the different armature circuits.

It will be understood that instead of using the current from each brush to create its commutating field the current may be used only to regulate the field, and yet retain the characteristic feature of my invention which is that the commutating field shall vary as the current at the brush varies, or in other words that the commutating field shall be a function of that current.

By the term "current collector" I intend to include any device making contact with the commutator through which the current flows into or out of the armature.

What I claim is:—

1. In a multipolar dynamo electric machine, a parallel wound armature, a plurality of positive current collectors and a plurality of negative current collectors, conductor leads extending from the several current collectors to the distribution mains, a plurality of commutating poles, and exciting windings for said poles connected in the several leads, to make an unbalancing of the current strength in the different armature circuits effective on the strength of the commutating fields.

2. A multi-polar dynamo-electric machine having a parallel wound armature and a plurality of commutating poles, a coil on each commutating pole, and connections between each coil and that current collector which is commutating armature coils directly beneath that particular commutating pole.

3. In a variable speed multi-polar dynamo-electric machine a parallel wound armature, a plurality of field poles having exciting windings in shunt to the armature, a variable resistance in said shunt, a plurality of commutating fields and means for creating variations in the strength of each commutating field corresponding to the variations in strength of the current flowing into the current-collector associated with that field, substantially as described.

4. In a multi-polar dynamo-electric machine a parallel wound armature, a plurality of negative current collectors, a plurality of positive current collectors, a commutating pole associated with each current collector, and an exciting winding on each commutating pole connected between its current collector and the external circuit, substantially as described.

In testimony whereof I affix my signature, in presence of two witnesses.

CHARLES H. BEDELL.

Witnesses:
HORACE ROBERSON,
MICHAEL A. O'HARE

Correction in Letters Patent No. 1,010,216

It is hereby certified that in Letters Patent No. 1,010,216, granted November 28, 1911, upon the application of Charles H. Bedell, of Bayonne, New Jersey, for an improvement in "Dynamo-Electric Machines," an error appears in the printed specification requiring correction as follows: Page 1, line 32, for the word "existing" read *exciting;* and that the said Letters Patent should be read with this correction therein that the same may conform to the record of the case in the Patent Office.

Signed and sealed this 16th day of January, A. D., 1912.

[SEAL.]

C. C. BILLINGS,
*Acting Commissioner of Patents.*